3,743,482
METHOD AND APPARATUS FOR DETERMINING THYROID FUNCTION

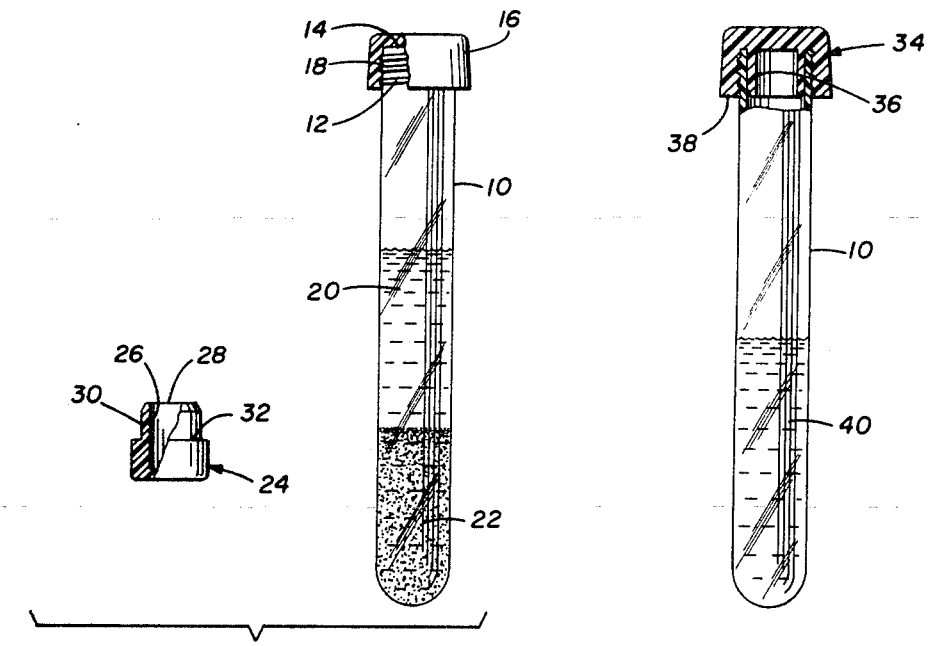
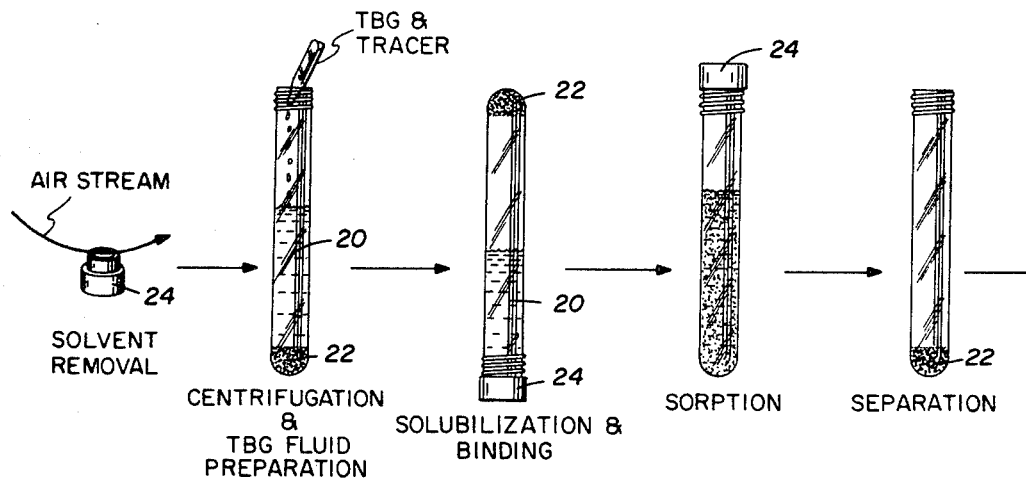
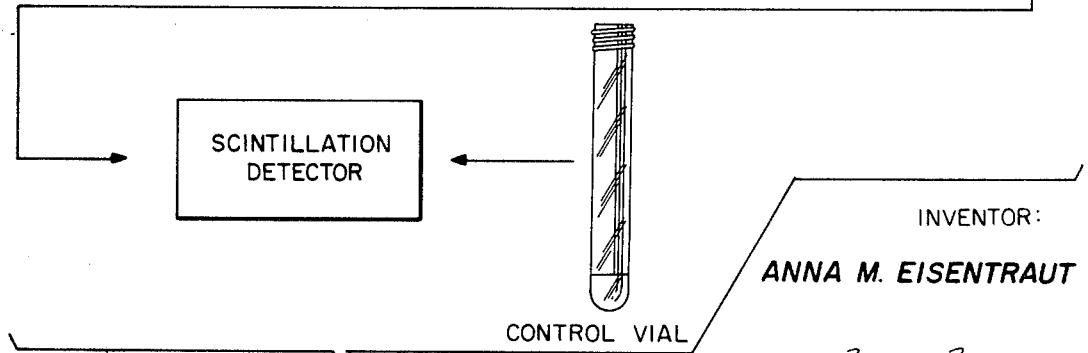
FIG. 1
FIG. 2
FIG. 3
INVENTOR:
ANNA M. EISENTRAUT

Anna M. Eisentraut, Dallas, Tex., assignor to Nuclear-Medical Laboratories, Inc., Dallas, Tex.
Filed Dec. 30, 1970, Ser. No. 102,827
Int. Cl. G01n *33/16*
U.S. Cl. 23—230 B               15 Claims

ABSTRACT OF THE DISCLOSURE

Method and apparatus for measuring the total amount of thyroid hormone within a body fluid. The procedure includes an extraction step whereby thyroid hormone (thyroxine) is initially extracted from a blood sample by acidifying the sample and thereafter extracting the thyroxine with a solvent such as alcohol. An aliquot of the solvent containing the extracted thyroxine is placed into a shallow well receptacle and the solvent is then evaporated by an impinging airstream. The shallow well receptacle is adapted to cooperate in sealing relationship with the open end of a buffer-containing vial so that when in place, a buffer solution containing known amounts of thyrobinding globulin and radioisotope labeled thyroid hormone can be mixed with the dried thyroxine by merely inverting the vial.

---

This invention relates to diagnostic tests for determining the level of thyroid hormone within a body fluid. In another aspect this invention relates to an improved method and apparatus for measuring total thyroid hormone in a body fluid.

Various diagnostic tests are known in the art for determining thyroid function. These tests include the basal metabolism test, the thyroid uptake test and various colorimetric chemical procedures for determining the level of thyroxine iodine in the blood. Among the most accurate tests available are the diagnostic tests which utilize radioisotope labeled hormone to indirectly determine the level of thyroid hormones, thyroxine ($C_{15}H_{11}I_4NO_4$), and triiodothyronine ($C_{15}H_{12}I_3NO_4$) present in body fluids. Specifically, these tests include a test commonly referred to as the T-3 test which measures the unsaturated binding capacity of thyrobinding globulin and other proteins within a body fluid such as blood, and the test commonly referred to as the T-4 test which measures the total quantity of hormone within a sample of blood serum.

Both of these tests include the steps of adding the radioisotope labeled hormone to a solution containing a sample of hormone produced within the body and thyrobinding globulin, separating the resulting thyrobinding globulin containing bound hormone from the resulting unbound hormone, and counting the radioactivity of either the bound or unbound hormone. This counting procedure will indicate the amount of endogenous hormone which is bound to the natural globulin and protein-binding sites within the blood.

Thus, both the T-3 and T-4 tests depend for their accuracy upon the efficient separation between the bound and unbound thyroid hormone in the test sample. The conventional methods for removal of these hormones include ion exchange resins such as the ion exchanger having strongly basic amino or quaternary ammonium groups as disclosed in U.S. 3,414,383. These organic ion exchange resins can be either in loose forms or incorporated in polyurethane sponges as disclosed in U.S. 3,206,602, or enclosed in porous bags or the like. Other such conventional methods involve a selective adsorption of the free hormones by charcoal which has been coated with suitable proteins or molecular sieves such as sephadex.

Recently, an improved thyroid hormone test has been developed and is set forth in copending application Serial Number 846,289. This new test includes sorbing the free hormones on a particulate, inorganic crystalline lattice material, such as magnesium silicate, for example. This new test is neither time nor temperature dependent, in that it can be carried out at any convenient room temperature over any convenient time period to obtain very accurate results. The sorbent will quickly and efficiently bind only the free or nonprotein bound thyroid hormone within a sample fluid. This test normally includes the admixing of the dry sorbent material with a suitable solution, such as a barbital buffer solution containing both the free hormones and the hormones bound to the natural binding sites (thyrobinding globulin and other proteins), thoroughly admixing until sorption of the free hormones and then separation of the sorbent from the resultant supernatant fluid.

Due to several factors which are discussed below, the T-3 test has generally become more widely employed than the T-4 test. However, in order to obtain a complete indication of the thyroid activity within the body, it is generally necessary to correlate the results of the T-3 test with the value of the total thyroid hormone content in the blood. Specifically, it is known that thyroid hormones do no exist freely in large amounts in the plasma but are bound to specific protein fractions therein. The hormones are transported throughout the body in this bound form. The binding strength of the protein fractions is generally constant within narrow limits in most humans. Thus, a measure of the unsaturated binding capacity of a sample by using a T-3 test will generally give an indication of the quantiy of thyroid hormone present in the blood. However, the T-3 test does not determine the total quantity of thyroid hormone in the blood, and certainly does not directly measure the amount or quantity of the natural binding sites within the blood. Thus, in order to get a complete indication of thyroid activity, it is necessary to correlate the measurement of unsaturated binding capacity for thyroid hormone with the total quantity of thyroid hormone in a sample. The T-4 test, which is a measure of the total amount of thyroid hormone in the blood can be used in conjunction with the T-3 test in order to get a true measure of the thyroid function.

Conventional T-4 tests include the steps of initially extracting the thyroid hormone from a sample of blood serum. This extraction step is usually accomplished with an organic solvent and serves the purpose of isolating the thyroid hormone from the proteins within the blood. Various extractants which have been utilized include alcohol mixed with alkaline reagents such as ammonium hydroxide, materials such as dimethoxypropane, and the like. However, the safest, most reproducible extractant materials which have been conventionally used include the lower aliphatic alcohols, and preferably ethanol or denatured alcohol, Formula 3A. After the extraction, the extractant is normally placed within a test tube in a temperature controlled zone and the organic solvent evaporated therefrom to leave a dry residue of the thyroid hormone. Next, the thyroid hormone is solubilized usually within a buffer containing known quantities of thyrobinding globulin and a tracer quantity of radioisotope-labeled thyroid hormone. Next, a sorbent material is utilized to separate the free thyroid hormone from the resulting bound thyroid hormone within the sample. Either the sorbent or the resulting supernatant fluid is measured by suitable means, such as with a scintillation well counter. Thereafter, the total amount of thyroid hormone within the sample is determined by correlation with a standard curve which is based upon radioactive counts present in samples containing known quantities of thyroid hormone.

Heretofore, most conventional T-4 tests have not been extremely reliable because of the failure to obtain reproducible and correlatable results. One of the problems in these tests is that the percent recovery of thyroid hormones from the initial extraction step must be calculated and applied to the measured values. The percent recovery varies greatly. When utilizing an alcohol such as ethanol or Formula 3A, the most widely used and acceptable extractants heretofore known in the art, the mean recovery value of the thyroid hormone is approximately 75%. However, the overall recovery is 75% ±13.5%, or a range of from 61.5 to 88.5%. The recovery of the thyroid hormone varies from day to day and certainly with each serum which is tested. Because of the unpredictability of the recovery value during the extraction step authorities, such as Ekins et al., Clin. Biochem. 2, 253, 1969, feel that it is mandatory to measure the individual recovery on each serum in order to obtain accurate results with the T-4 test. This additional procedure of determining the individual recovery for each serum is considered prohibitive in most clinical circumstances.

The unpredictable extraction efficiency described above, coupled with the burdensome and tedious techniques which must be followed with conventional T-4 tests whereby the temperature and time must be closely controlled during the sorption steps have resulted in the T-4 test which although recognized as extremely valuable, has nevertheless not been widely accepted.

Therefore, one object of this invention is to provide an improved T-4 test method and apparatus.

Another object of this invention is to provide an improved technique for separating thyroid hormone from blood serum in a T-4 diagnostic test.

A further object of this invention is to provide an improved T-4 test method and apparatus which yields highly reproducible results, which test is neither time nor temperature dependent, and wherein the necessity for applying a percentage recovery value of the thyroid hormone from the blood serum to a set of standard data is eliminated.

According to one embodiment of this invention, a novel T-4 test is provided which includes initially extracting thyroid hormone from a body fluid by first acidifying the body fluid preferably to a pH region of about 4, and generally in the range of from about 3 to 7, and thereafter effecting the extraction with an organic solvent such as an alcohol. The acidification can be effected with any suitable means, but it is preferred that a volatile acid such as acetic acid be utilized since it will become entrained with the organic solvent and removed from the extracted thyroid hormone during the drying process. When utilizing this procedure, all extracts are completely clear and the average recovery value was 92.9% ±3.8%.

According to another embodiment of this invention, the extracted thyroid hormone contained within the solvent is assayed by initially placing an aliquot thereof in a shallow well receptacle. The shallow well receptable is adapted to communicate and seal with the open end of a vial which carries a buffer solution. The solvent is removed from the thyroid hormone by passing a gas stream, preferably a warm air stream over the shallow well. This action quickly and effectively removes the solvent to yield a residue of thyroid hormone at the base of the shallow well. Next, the shallow well is placed in operative sealing relationship with the open end of the vial which contains an aqueous buffer material, a predetermined amount of thyrobinding globulin, and a tracer quantity of radioactive labeled thyroid hormone. Thereafter, the sealed vial is inverted to allow the thyroid hormone to become solubilized by the solution within the vial. After the solution is equilibrated, the free hormones are separated from the bound hormones by introducing a particulate inorganic crystalline lattice material, which is centrifuged. One of the fractions is then counted in a scintillation counter.

According to a further embodiment of this invention, a novel apparatus is provided for carrying out the above-described test.

This invention can be more easily understood from a study of the drawings in which:

FIG. 1 is an elevational view partly in section of an apparatus of this invention;

FIG. 2 is an elevational view partially in section of an alternative embodiment of this invention; and FIG. 3 is a schematic diagram illustrating a method of the present invention.

Now referring to FIG. 1, the basic components of applicant's novel apparatus for use in a T-4 thyroid hormone test are illustrated in detail. Vial 10 comprises an elongated cylindrical container carrying threaded portion 12 around its open end 14. Vial 10 is preferably made of a clear plastic material, e.g., polystyrene or polycarbonate. Open end 14 is fitted with removable closure member 16 having internal threads 18, which thereby cooperate with threads 12.

Vial 10 is shown as containing a layer of a buffer material 20 which will be described in detail hereinbelow and a layer of inorganic crystalline lattice sorbent material 22, which will also be further described in detail hereinbelow.

Sample receptacle 24 comprises a body made of a resilient plastic material such as polyethylene and carries an internal cylindrical cavity 26 which communicates with opening 28. Upper cylindrical portion 30 is slightly smaller in diameter than the open end 14 of vial 10 such that when opening 28 of sample receptacle 24 is inserted within open end 14 of vial 10, cylindrical portion 30 will fit in sealing engagement with the internal periphery of vial 10. Continuous shoulder 32 extends outwardly and uniformly from the periphery of upper cylindrical portion 30 and is adapted to rest against open end 14 of vial 10 when upper cylindrical portion 30 is contained therewithin.

FIG. 2 illustrates an alternative embodiment of the apparatus of FIG. 1 wherein the features of closure member 14 are combined with sample receptacle 24. As illustrated, receptacle sealing member 34 includes upper cylindrical portion 36 which is substantially the same as cylindrical portion 30 of sample receptacle 24. The base of the receptacle sealing member 34 is slightly larger in diameter than the base of sample receptacle 24 and cylindrical sidewalls 38 extend therefrom carrying threaded portions on the inner periphery thereof which coact with threaded portion 12 on the outside upper periphery of vial 10 to thereby allow receptacle sealing member 34 to rest in sealing engagement in the upper portion of vial 10 when the coacting threads are engaged in conventional manner. It is noted in FIG. 2 that vial 10 is shown as containing a buffer solution 40 which can be the same material as buffer solution 20 contained within vial 10 of FIG. 1. However, the purposes of illustration, no mass of particulate inorganic sorbent material is illustrated in vial 10 in FIG. 2. The particulate inorganic sorbent material can be added to vial 10 at the proper time either in loose particulate form or tablet form.

As shown in FIG. 1, the particulate inorganic crystalline lattice material which can be used within the scope of this invention includes the phosphates, oxides, hydroxides, silicates, carbonates, aluminates, and sulfates, of the metallic elements in Groups I-A, II-A, III-A, II-B and VIII of the Periodic Table as illustrated on page B-2 of the Handbook of Chemistry and Physics, Chemical Rubber Publishing Company (1964). Examples of suitable materials include calcium carbonate, calcium phosphate, calcium oxide, calcium hydroxide, calcium silicate, calcium aluminate, calcium sulfate, magnesium carbonate, magnesium phosphate, magnesium oxide, magnesium hydroxide, magnesium silicate, magnesium aluminate, magnesium sulfate, aluminum carbonate, aluminum phosphate, aluminum oxide, aluminum hydroxide, aluminum silicate, aluminum sulfate, potassium carbonate, potassium phosphate, potassium oxide, potassium hydroxide, potassium silicate, potassium aluminate, potassium sulfate, iron carbonate, iron phosphate, iron oxide, iron hydroxide, iron silicate, iron aluminate, iron sulfate, barium carbonate, barium phosphate, barium oxide, barium hydroxide, barium silicate, barium aluminate, barium sulfate, zinc carbonate, zinc phosphate, zinc oxide, zinc hydroxide, zinc silicate, zinc aluminate, zinc sulfate, and mixed salts thereof.

Some specific examples of commonly occurring materials which can be used within the scope of this invention include:

opal, $Si(OH)_4 + SiO_2$;
waterglass, $Si_4O_9Na_2$;
kaolinite, $Al_2(SiO_5)(OH)_4$;
dickite, $Al_2(Si_2O_5)(OH)_4$;
nacrite, $Al_2(Si_2O_5)(OH)_4$;
metahalloysite, $Al_2(Si_2O_5)(OH)_4$;
halloysite, $Al_2(SiO_3)(OH)_3$;
attapulgite, $Mg_3(Si_4O_{10})(OH)_2(OH) \cdot 2H_2O$, $Al(Si_4O_{10})(OH)_2$;
pyrophyllite, $Al_2(Si_4O_{10})(OH)_2$;
talc, $Mg_3(Si_4O_{10})(OH)_2$;
montmorillonite, $Al_2(Si_4O_{10})(OH)_2 \cdot xH_2O$, $Mg(Si_4O_{10})(OH_2 \cdot xH_2O$;
nontronite, $Fe_2(Si_4O_{10})(OH)_2 \cdot xH_2O$, $Mg(Si_4O_{10})(OH)_2 \cdot xH_2O$;
beidellite, $Al_2(Si_4AlO_{10})(OH)_2 \cdot xH_2O$, $Mg(Si_4AlO_{10})(OH)_2 \cdot xH_2O$;
saponite, $Mg_3(Si_4O_{10})(OH)_2 \cdot xH_2O$;
illite, $K_y \cdot Al_2(Si_{4-y})O_{10}$, $Fe_2 \cdot Mg_2 \cdot Mg_3(Si_{4-y} \cdot Al_y)O_{10}$;
muscovite, $K \cdot Al_2(AlSi_3O_{10})(OH)_2$;
paragonite, $Na \cdot Al_2(AlSi_3O_{10})(OH)_2$;
phlogonite, $K \cdot Mg_3(AlSi_3O_{10})(OH)_2$;
biotite, $K \cdot (Mg_1Fe)_3(AlSi_3O_{10})(OH)_2$;
margarite, $Ca \cdot Al_2(Al_2 \cdot Si_3 \cdot O_{10})(OH)_2$.

The most preferred inorganic crystalline sorbent materials include the silicates, particularly magnesium silicate and aluminum silicate. Other preferred sorbent materials are calcium phosphate, silicic acid, aluminum hydroxide, calcium oxide, and magnesium carbonate and magnesium oxide.

Ideally, the size of the crystalline sorbent material should allow rapid contrifugation. Also the material should remain packed while inverted and yet be easily resuspended. Thus, the preferable diameter range is $10^{-4}$ to $10^{-3}$ centimeters, although the sorbent material can have a size of $10^{-7}$ to $10^{-1}$ centimeters.

Buffer material 20 can be any suitable aqueous buffer material such as for example, a barbital buffer solution (diethyl barbituric acid, pH 8.6, 0.75 M), or an aqueous glycine buffer solution (pH 6, 0.2 M).

In addition, as shown in FIG. 1, sorbent 22 preferably has been treated in aqueous buffer solution 20 by the stabilization process disclosed in copending patent application Ser. No. 15,216, filed Feb. 27, 1970. Basically, the particulate inorganic crystalline lattice sorbent material is wetted with the aqueous buffer and heated for sufficient time to cause the sorption capacity of the material to stabilize. Generally, the sorbent material is heated to a temperature of from about 25° C. to the boiling point of the aqueous buffer, and preferably to a temperature of at least 60° C. in accordance with the invention described in said copending patent application.

Now referring to FIG. 3, the T-4 analysis technique of this invention will be described in detail. When practicing in accordance with the first embodiment of this inventon, the thyroid hormone (thyroxine) is initially extracted from the sample serum which has been acidified. It is generally preferred that the pH of blood serum be adjusted to a value of approximately 4. Slightly higher recovery values are noted if the pH is adjusted with an acid before precipitation with an organic solvent. Any suitable volatile acid, such as HCl, formic, acetic or butyric acid can be utilized, or if desired, a mineral acid, such as sulfuric acid can be utilized and later neutralized after the extraction process with a base such as NaOH. As used in the scope of this invention, a "volatile" acid is one that will be substantially completely removed during evaporation of the organic solvent when recovering the residue of thyroid hormone therefrom. The most preferred volatile acid is acetic acid.

Any suitable organic solvent which is non-deleterious to the extraction process, such as alcohol, can be utilized. The preferred solvents are monohydric and dihydric alcohols. For example, ethanol, methanol, propanol, butanol, diethylene glycol, mixtures thereof, and the like can be utilized as the extractant solvent within the scope of this invention. The most preferred solvent comprises at least 90 weight percent ethanol.

A typical procedure when utilizing the apparatus of FIG. 1 and 0.4 milliliter of sample serum is to initially add 0.4 milliliter of 0.1 N acetic acid to the serum to form a mixture and then add 1.2 milliliters of the alcohol solvent thereto. It is noted at this point, that although recovery is slightly higher, it is not necessary to actually alter the pH of the serum before the solvent is admixed therewith. It is only necessary that at the time of the extraction, the serum is acidified. Therefore, from the standpoint of convenience, the preferred procedure is to actually add a mixture of the acid and solvent to the serum. When operating in accordance with this most preferred procedure, adequate acetic acid is admixed with the solvent to yield a normality of the acetic acid in the solvent in the range of from 0.002 N to 0.1 N, and furthermore, the final solvent concentration should preferably be at least about 60% by volume of the mixture of acid, solvent, and serum. After the addition of the acid and solvent to the serum, the constituents are mixed for a few seconds to cause precipitation of serum proteins and thereby leave the thyroxine in solution. The mixture which was determined to yield optimal results consists of 1 part 0.5 N acetic acid and 9 parts of the alcohol.

Next, an aliquot (for example 0.4 milliliter) of the extract containing the thyroid hormone is pipetted into sample receptacle 24. Sample receptacle 24 is placed on a flat surface and the solvent is removed by simply passing a gas such as airstream over opening 28 (solvent removal step of FIG. 3). It has been found that an airstream which is heated to a temperature up to about 45° C. will cause complete removal of the solvent with the small amount of acetic acid within 45 minutes. Thus, neither a controlled temperature waterbath nor a manifold for supplying a drying gas to a test tube containing the solvent and extracted hormone is necessary. In addition, the necessity for vigorous mixing such as with a Vortex mixer is obviated.

Buffer solution 20 within vial 10 is next prepared to receive a source of thyrobinding globulin and a tracer quantity of the radioisotope labeled thyroid hormone by subjecting vial 10 to centrifugation to thereby cause the inorganic crystalline lattice material 22 to pack firmly in the bottom of vial 10 (centrifugation and TBG fluid preparation step in FIG. 3). Alternately, the inorganic crystalline lattice material can be added to a buffer solution, in a tablet form. Vial 10 would then contain only the buffer solution.

Although whole human or some animal serum may be used, the most preferred source of thyrobinding globulin is a lyophilized commercially prepared human alpha globulin fraction. It is preferred that albumin contamination within such fractions be as minimal as possible, since the greater the purity of alpha globulin, the greater the assay sensitivity. In this example, 0.4 milliliters of barbital buffer pH 8.6 can be added containing 1 weight percent of the human alpha globulin. A tracer amount of radioisotope labeled thyroid hormone is also added to the buffer at this time.

Any radioactive isotope of iodine, tritium, or carbon can be used. It is preferred that a hormone be utilized which is labeled with either radioactive $I^{131}$ or $I^{125}$. Once the thyrobinding globulin and the radioactive isotope is thoroughly admixed in the buffer fluid, sample receptacle 24 containing a dry deposit of thyroid hormones is firmly fitted in operative relationship in the open end 14 of vial 10, and vial 10 is inverted to cause solubilization of the thyroid hormone by the buffer and binding of the thyroid hormone by the thyrobinding globulin contained therein (solubilization and binding step of FIG. 3). To insure homogeneity, the mixture is swirled gently about 3 times during a 15 minute period. It is noted that this exchange is not altered by low temperatures and therefore the entire assay can be performed at room temperature. It is noted further that during the solubilization period, when utilizing the apparatus as illustrated in FIG. 1, the centrifuged and packed organic crystalline sorbent material 22 remains firmly in the botton of vial 10.

After solubilization and equilibration of the thyroid hormone within buffer solution 20 containing the standard amount of thyrobinding globulin and radioactive isotope labeled thyroid hormone, the inorganic crystalline lattice sorbent material 22 is placed in contact with the solution. When utilizing vial 10 as illustrated in FIG. 1 and as illustrated in the sorption step of FIG. 3, the tube is merely inverted and subjected to rigorous shaking for about 30 seconds and allowed to set for 30 minutes or more to allow the sorbent to bind the free thyroid hormone in the buffer solution. Binding is almost complete after 15 minutes but slight increases are occasionally seen until 30 minutes have elapsed. If the standards and the unknowns are shaken and centrifuged simultaneously, the tubes can be centrifuged after 15 minutes.

After the binding step, the tubes are centrifuged for 2–4 minutes, the supernatant fluid separated from the sorbent by decantation (separation step of FIG. 3), and either the resultant supernatant fluid or the sorbent, preferably the sorbent, is counted in a scintillation well counter. The reading of scintillation counter is compared to the total number of counts initially added to obtain percent uptake values. The total counts per minute are determined by measuring the total counts of the tracer quantity of radioactive isotope labeled thyroid hormone within a quantity of buffer material equal in volume to that quantity of material (whether sorbent material or liquid buffer material) which is being counted in the scintillation well counter from each test sample (control vial measurement step in FIG. 3). The percent uptake values are then correlated with standard values obtained by measuring percent uptake of standard samples containing known amounts of thyroid hormone, to thereby determine the amount of thyroid hormone within each sample.

The preparation of the standard samples and the counting techniques are preferably carried out by the same procedure as described above for the unknowns. Specifically, a standard serum sample containing 20 micrograms of total serum thyroxine per hundred milliliters of serum are prepared. The standard is pooled normal serum which has been assayed by carefully controlled independent methods. Thereafter, pure crystalline thyroxine diluted in 0.25% bovine albumin in water is added to the serum to yield a final total concentration of 20 µg. percent. Preferably, each of the test kits of the subject invention is provided with this standard serum containing a measured quantity of thyroxine which would be equivalent to 0, 5, 10, 15, and 20 grams percent serum when extracts of 0, 100, 200, 300, and 400 microliters thereof are dried.

After the standard serum is prepared, it is then processed as described above from the extraction step through the counting step in the scintillation well counter. When the standards are processed in this matter, any possible errors are eliminated, such as daily variations often noted in recovery of thyroxine in the extraction step. The extraction of the standard serum automatically nullifies such differences. In addition, the extraction loss as described above (approximately 7 percent with the present mehod) need not be applied to the final calculations since the percent recovery in the "pseudo-serum" is almost identical to the average value obtained in the samples and does not vary as do conventional extraction loss values.

The following examples are given to better facilitate the understanding of this invention and are not intended to limit the scope thereof.

EXAMPLE 1

A comparison of extraction efficiency and reproducibility between the extraction step carried out in accordance with this invention and a conventional extraction step which utilizes the same alcohol extractant but without a pH altering material is demonstrated in Table I below. In each instance, a mixture of 95% ethanol, and 5% methanol containing an additional 5% 2-propanol was utilized. However, when extracting in accordance with this invention the alcohol contained 10 volume percent of 0.5 N acetic acid.

TABLE I

| Serum; | 1 vol. serum plus 4 vol. acidified alcohol, percent | 1 vol. serum plus 2 vol. alcohol, percent |
|---|---|---|
| 1 | 94.1 | 75.6 |
| 2 | 93.4 | 85.2 |
| 3 | 92.4 | 73.5 |
| 4 | 93.1 | 75.5 |
| 5 | 90.0 | 74.0 |
| 6 | 93.3 | 71.5 |
| 7 | 90.0 | 71.8 |
| 8 | 91.7 | 73.1 |
| 9 | 92.5 | 79.5 |
| 10 | 92.6 | 71.7 |
| 11 | 92.6 | 75.0 |
| 12 | 89.1 | 75.0 |
| Mean | 92.1 | 75.1 |
| S.D. | 1.56 | 3.86 |

Thus, with a normal error of three times the standard deviation, it can readily be seen, the expected percent recovery range of the normal serum which occurs in accordance with this invention is from 87.4% to 96.8%. However, when using only the conventional alcohol, mixture for extraction recovery range of from 63.5% to 86.7% is expected.

EXAMPLE 2

To illustrate assay validity, the preferred T–4 test procedure described above in the specification was carried out to determine the percent recovery of exogenous thyroxine which was added to 3 pools of serums. In each instance, varying quantities of exogenous thyroxine, diluted in water containing 0.25% albumin was added to a known amount of pooled serum. Three serum pools were utilized and the results of the tests are shown in Tables II, III and IV below.

In each test, vial 10 contained 25 milligrams of magnesium silicate crystalline lattice sorbent material USP grade aerosol cosmetic talc which had been stabilized by heat treatment in 1 milliliter of a glycine buffer (0.2 M, pH 6). The extraction step was conducted by adding to 0.4 milliliters of serum a mixture of 1.44 milliliters of alcohol (a 95% ethanol-5% methanol mixture containing an additional 5% 2-propanol) and 0.16 milliliters of 0.5 N acetic acid. Each 0.4 ml. sample aliquot of solvent containing thyroxine was dried in a sample receptacle 24, by impinging a 45° C. airstream thereupon for 30 minutes. The airstream was produced by a conventional hair dryer (Oster, Model 202). The thyrobinding globulin source added to the buffer solution during the test comprised 0.4 milliliters barbital, pH 8.6 containing 1 wt. percent human alpha globulin, and a tracer amount of $I^{125}$ labeled thyroxine.

TABLE II

| Measured endogenous thyroxine | Exogenous thyroxine added | Total predicted | Total recovered | Percent recovery |
|---|---|---|---|---|
| 4.8 | 5 | 9.8 | 9.6 | 98.0 |
| 4.8 | 10 | 14.8 | 14.1 | 95.3 |
| 4.8 | 15 | 19.8 | 19.5 | 98.5 |

TABLE III

| Measured endogenous thyroxine | Exogenous thyroxine added | Total predicted | Total recovered | Percent recovery |
|---|---|---|---|---|
| 6.5 | 5 | 11.5 | 11.9 | 103.5 |
| 6.5 | 10 | 16.5 | 15.9 | 96.4 |
| 6.5 | 15 | 21.5 | 20.4 | 94.9 |

TABLE IV

| Measured endogenous thyroxine | Exogenous thyroxine added | Total predicted | Total recovered | Percent recovery |
|---|---|---|---|---|
| 10.1 | 5 | 15.1 | 14.7 | 97.4 |
| 10.1 | 10 | 20.1 | 19.8 | 98.5 |
| 10.1 | 15 | 25.1 | 25.5 | 101.6 |

EXAMPLE 3

To illustrate the specificity of the T-4 test which is carried out in accordance with this invention, the following "proportional dilution" studies as illustrated in Tables V-VIII below were carried out. "Proportional dilution" studies were selected since they are a classical means of demonstrating that an assay does not result in nonspecific variables, i.e., to determine if measured values are proportional to the volume of serum or extract assayed. If so, then it is apparent that the kinetics of the reactions of the standards are identical to that of the serum. When assay values are plotted on the horizontal axis of linear graph paper versus serum volume on the vertical axis, a straight line should be drawn through the points. An additional requirement of such studies is that such lines must intersect the zero of both axes. The studies done below were made using 3 different serum pools. The above-described T-4 test specifically set forth in Example 2 was conducted (2 runs) for each volume (in microliters) for a particular serum pool.

TABLE V.—SERUM POOL 1

| Extract volume assayed ($\mu$l.) | $\mu$g. percent T-4 | $\mu$g. percent T-4 per 100 $\mu$l. extract (calculated) |
|---|---|---|
| 400 | 8.6 | 2.15 |
|  | 8.5 | 2.13 |
| 200 | 4.2 | 2.10 |
|  | 4.2 | 2.10 |
| 100 | 2.0 | 2.00 |
|  | 2.0 | 2.00 |

TABLE VI.—SERUM POOL 2

| Extract volume assayed ($\mu$l.) | $\mu$g. percent T-4 | $\mu$g. percent T-4 per 100 $\mu$l. extract (calculated) |
|---|---|---|
| 400 | 14.6 | 3.65 |
|  | 15.0 | 3.75 |
| 200 | 7.2 | 3.60 |
|  | 6.7 | 3.35 |
| 100 | 3.2 | 3.20 |
|  | 3.6 | 3.60 |

TABLE VII.—SERUM POOL 3

| Extract volume assayed ($\mu$l.) | $\mu$g. percent T-4 | $\mu$g. percent T-4 per 100 $\mu$l. extract (calculated) |
|---|---|---|
| 400 | 17.4 | 4.35 |
|  | 18.3 | 4.58 |
| 200 | 8.2 | 4.10 |
|  | 8.6 | 4.30 |
| 100 | 4.2 | 4.20 |
|  | 4.1 | 4.10 |

A plot of these data clearly indicates that assays carried out in accordance with the subject invention result in values which are proportional to volume. In addition, the duplicate values indicate results which would be considered highly reproducible by prior art methods.

It is to be understood that various modifications of this invention will now become apparent to one skilled in the art upon reading this specification and it is intended to cover such modifications as fall within the scope of the appended claims.

I claim:

1. In a method of determining the amount of thyroid hormone in a serum sample whereby the thyroid hormone is initially extracted from said sample with a solvent and thereafter admixed with a known amount of thyrobinding globulin and radioactive isotope labeled thyroid hormone and then the resulting mixture is contacted with a particulate inorganic crystalline sorbent material selected from silicic acid and carbonates, phosphates, oxides, hydroxides, silicates, aluminates and sulfates of the metallic elements of Groups I-A, II-A, III-A, II-B and VIII of the Periodic Table, and mixed salts thereof to remove free thyroid hormone therefrom and either the sorbent or the remaining supernatant fluid is counted with a scintillation counter, the improvement comprising:
   stabilizing the amount of recovered thyroid hormone from said serum by acidifying the pH of said serum before said extracting.

2. The method of claim 1 wherein the pH of said serum is initially adjusted to a value between 3 and 7.

3. A method of measuring thyroxine in a serum sample comprising:
   (a) adjusting said serum sample to a pH value below 7.0;
   (b) extracting thyroxine from said serum sample at the adjusted pH with an organic solvent;
   (c) separating the extracted thyroxine from said organic solvent;
   (d) equilibrating a buffer solution of said extracted thyroxine with thyrobinding globulin and a radioactive isotope labeled thyroxine;
   (e) thoroughly admixing the equilibrated solution of step (d) with a particulate inorganic crystalline sorbent material selected from silicic acid and carbonates, phosphates, oxides, hydroxides, silicates, aluminates, and sulfates of the metallic elements of Groups I-A, II-A, III-A, II-B and VIII of the Periodic table, and mixed salts thereof to remove free thyroxine therefrom;
   (f) separating said sorbent material from the resulting solution; and
   (g) counting with a scintillation counter one of (1) free labeled thyroxine bound by said sorbent, and (2) labeled thyroxine remaining in said solution.

4. The method of claim 3 wherein said pH is adjusted to a value between 3 and 7 before said extracting.

5. The method of claim 3 wherein said organic solvent is an alcohol.

6. The method of claim 5 wherein said organic solvent comprises at least 90% ethanol.

7. The method of claim 6 wherein said adjusting of said pH to a value of less than 7 comprises admixing acetic acid with said serum sample.

8. The method of claim 7 wherein said adjusting of said pH and said extracting of said thyroxine from said serum comprises admixing with said serum a mixture of alcohol and acetic acid.

9. In a method of determining the amount of thyroid hormone in a serum sample whereby the thyroid hormone is initially extracted from said sample with a solvent and thereafter admixed with a known amount of thyrobinding globulin and radioactive isotope labeled thyroid hormone and then the resulting mixture is contacted with a sorbent material to remove free thyroid hormone therefrom and either the sorbent or the remaining supernatant fluid is counted with a scintillation counter, the improvement comprising:

stabilizing the amount of recovered thyroid hormone from said serum by acidifying the pH of said serum before said extracting by adding a volatile acid thereto; and thereafter removing said solvent and said volatile acid from said thyroid hormone by evaporation to yield a residue of said thyroid hormone which is thereafter admixed with said known amount of thyrobinding globulin.

10. The improved method of claim 9 wherein the pH of said serum is initially adjusted to a value between 3 and 7.

11. The improved method of claim 9 wherein said solvent and said volatile acid are removed from said thyroid hormone by depositing said solvent carrying said volatile acid and thyroid hormone within an open ended shallow well receptacle and thereafter passing a gas stream over the open end of said shallow well receptacle to cause said evaporation.

12. The improved method of claim 9 wherein said volatile acid is acetic acid.

13. The improved method of claim 12 wherein said acetic acid is admixed with said solvent and the resulting mixture is then admixed with said serum.

14. The improved method of claim 13 wherein sufficient acetic acid is admixed with said solvent to yield a normality of said acetic acid in said solvent in the range of 0.002 N to 0.1 N, and sufficient solvent is added to said serum to yield a mixture of said acid, solvent and serum containing at least about 60% by volume of said solvent.

15. The improved method of claim 14 wherein said solvent comprises at least 90% ethanol.

References Cited
UNITED STATES PATENTS

| | | | |
|---|---|---|---|
| 3,380,888 | 4/1968 | Numerof et al. | 23—230 B X |
| 3,414,383 | 12/1968 | Murphy | 23—253 R X |

MORRIS O. WOLK, Primary Examiner

R. M. REESE, Assistant Examiner

U.S. Cl. X.R.

424—1; 250—106 T

UNITED STATES PATENT OFFICE
CERTIFICATE OF CORRECTION

Patent No. 3,743,482  Dated July 3, 1973

Inventor(s) Anna M. Eisentraut

It is certified that error appears in the above-identified patent and that said Letters Patent are hereby corrected as shown below:

Title "METHOD AND APPARATUS FOR DETERMINING THYROID FUNCTION" should be "METHOD FOR DETERMINING THYROID FUNCTION". Col. 1, lines 36 and 27, after "colorimetric" the word "and" should be inserted.
Col. 4, line 60, after "However," delete "the" and insert --for--.
Col. 7, line 11, "hormones" should be "hormone".
Col. 10, line 4 (heading to second Column of TABLE VII, Serum Pool 3) "Pg Percent T-4" should be "$\mu$g. Percent T-4".

Signed and sealed this 26th day of March 1974.

(SEAL)
Attest:

EDWARD M. FLETCHER, JR.
Attesting Officer

C. MARSHALL DANN
Commissioner of Patents